United States Patent
Lane et al.

(10) Patent No.: US 11,959,445 B1
(45) Date of Patent: Apr. 16, 2024

(54) ISOLATION OF PLATE THERMAL EXPANSION BETWEEN DIFFERENT EXPANSION RATE MATERIALS

(71) Applicant: Solar Turbines Incorporated, San Diego, CA (US)

(72) Inventors: Michael A. Lane, Lakeside, CA (US); Ricardo Aleman, San Diego, CA (US); Robert Fanella, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/123,149

(22) Filed: Mar. 17, 2023

(51) Int. Cl.
*F02M 61/16* (2006.01)

(52) U.S. Cl.
CPC ....... *F02M 61/167* (2013.01); *F02M 2200/03* (2013.01); *F02M 2200/85* (2013.01)

(58) Field of Classification Search
CPC ............. F02M 61/167; F02M 2200/03; F02M 2200/85
See application file for complete search history.

(56) References Cited

U.S. PATENT DOCUMENTS

| 6,773,843 B2 | 8/2004 | Kitagawa et al. | |
| 2017/0227224 A1* | 8/2017 | Oskam | F23R 3/28 |
| 2017/0299190 A1* | 10/2017 | Patel | F02C 7/22 |
| 2018/0163967 A1* | 6/2018 | Arellano | F23R 3/286 |

FOREIGN PATENT DOCUMENTS

CN 104164265 B 11/2016

* cited by examiner

*Primary Examiner* — Grant Moubry
*Assistant Examiner* — Ruben Picon-Feliciano
(74) *Attorney, Agent, or Firm* — Procopio, Cory, Hargreaves & Savitch LLP

(57) ABSTRACT

In a fuel injector, the temperature differential between a distributor plate, through which relatively cool fuel passes, and the manifold to which the distributor plate is bonded causes stresses and strains that can reduce the durability and longevity of the fuel injector. In disclosed embodiments, the distributor plate is bonded to an outer arm and inner arm. These arms act as levers to take up the stresses and strains caused by the temperature differential, thereby increasing the durability and longevity of the fuel injector.

20 Claims, 4 Drawing Sheets

ISOLATION OF PLATE THERMAL EXPANSION BETWEEN DIFFERENT EXPANSION RATE MATERIALS

TECHNICAL FIELD

The embodiments described herein are generally directed to a fuel injector, and, more particularly, to the isolation of thermal expansions of materials that are subject to different expansion rates during operation of a fuel injector.

BACKGROUND

A fuel injector comprises a flow path for fuel to flow from an inlet of the fuel injector to outlets in the injector head. A distributor plate may intersect this flow path in a fuel gallery, forward from the outlets, to provide flow metering and fuel distribution to the outlets. The distributor plate generally comprises an annular disk that seals a forward side of the gallery from an aft side of the gallery. The annular disk is perforated to allow fuel to pass from the forward side to the aft side of the gallery, according to the desired characteristics of flow metering and fuel distribution. An outer edge of the distributor plate is bonded to a radially outer wall of the injector head, and the inner edge of the distributor plate is bonded to a radially inner wall of the injector head.

The outer wall of the injector head is subjected to the high-temperature environment surrounding the fuel injector. In contrast, the distributor plate is cooled by the relatively cool fuel flowing through the fuel gallery. Thus, the distributor plate experiences a degree of thermal expansion that is different (e.g., less) than the walls of the injector head, to which the distributor plate is bonded. The difference in these degrees of thermal expansion produces high stresses and strains within the distributor plate and within the walls to which the distributor plate is bonded. This, in turn, reduces the durability and longevity of the fuel injector.

The present disclosure is directed toward overcoming one or more of the problems discovered by the inventors, including the mitigation of these stresses and strains.

SUMMARY

In an embodiment, a fuel injector assembly comprises: a fuel gallery that is annular around an injector axis; an inner arm that is annular around the injector axis and positioned within the fuel gallery, wherein the inner arm includes a first axial portion, and wherein an inner diameter of the first axial portion is greater than an inner diameter of the fuel gallery, such that a first space exists between the first axial portion and a radially inner surface of the fuel gallery; an outer arm that is annular around the injector axis and positioned within the fuel gallery, wherein the outer arm includes a second axial portion, wherein an outer diameter of the second axial portion is less than an outer diameter of the fuel gallery, such that a second space exists between the second axial portion and a radially outer surface of the fuel gallery; and a distributor plate that is annular around the injector axis and positioned between the first axial portion and the second axial portion to divide the fuel gallery into a forward region and an aft region, wherein a radially inner edge of the distributor plate is bonded to the first axial portion, and wherein a radially outer edge of the distributor plate is bonded to the second axial portion.

In an embodiment, a fuel injector comprises: a manifold that defines a fuel gallery that is annular around an injector axis, wherein the manifold comprises an outer wall, and an inner arm that is annular around the injector axis and positioned within the fuel gallery, wherein the inner arm includes a first axial portion, and a first curved portion that curves radially inward, relative to the first axial portion, to define a first space, between the first axial portion and a radially inner surface of the fuel gallery, with a sealed aft end; an outer arm that is annular around the injector axis and positioned within the fuel gallery, wherein the outer arm includes a second axial portion, and a second curved portion that curves radially outward, relative to the second axial portion, to define a second space, between the second axial portion and a radially outer surface of the fuel gallery, with a sealed aft end; and a distributor plate that is annular around the injector axis and positioned between the first axial portion and the second axial portion to divide the fuel gallery into a forward region and an aft region, wherein a radially inner edge of the distributor plate is bonded to the first axial portion, wherein a radially outer edge of the distributor plate is bonded to the second axial portion, wherein the distributor plate comprises a plurality of apertures extending from a forward side of the distributor plate to an aft side of the distributor plate, and wherein each of the plurality of apertures is configured to allow fuel to flow from the forward region to the aft region of the fuel gallery.

In an embodiment, a gas turbine engine comprises: a compressor; a combustor downstream from the compressor, wherein the combustor includes a plurality of fuel injectors, and wherein each of the plurality of fuel injectors comprises a manifold that defines a fuel gallery that is annular around an injector axis, wherein the manifold comprises an inner arm that is annular around the injector axis and positioned within the fuel gallery, wherein the inner arm includes a first axial portion, and a first curved portion that curves radially inward, relative to the first axial portion, to define a first space, between the first axial portion and a radially inner surface of the fuel gallery, with a sealed aft end, an outer arm that is annular around the injector axis and positioned within the fuel gallery, wherein the outer arm includes a second axial portion, and a second curved portion that curves radially outward, relative to the second axial portion, to define a second space, between the second axial portion and a radially outer surface of the fuel gallery, with a sealed aft end, and a distributor plate that is annular around the injector axis and positioned between the first axial portion and the second axial portion to divide the fuel gallery into a forward region and an aft region, wherein a radially inner edge of the distributor plate is bonded to the first axial portion, wherein a radially outer edge of the distributor plate is bonded to the second axial portion, wherein the distributor plate comprises a plurality of apertures extending from a forward side of the distributor plate to an aft side of the distributor plate, and wherein each of the plurality of apertures is configured to allow fuel to flow from the forward region to the aft region of the fuel gallery; and a turbine downstream from the combustor.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
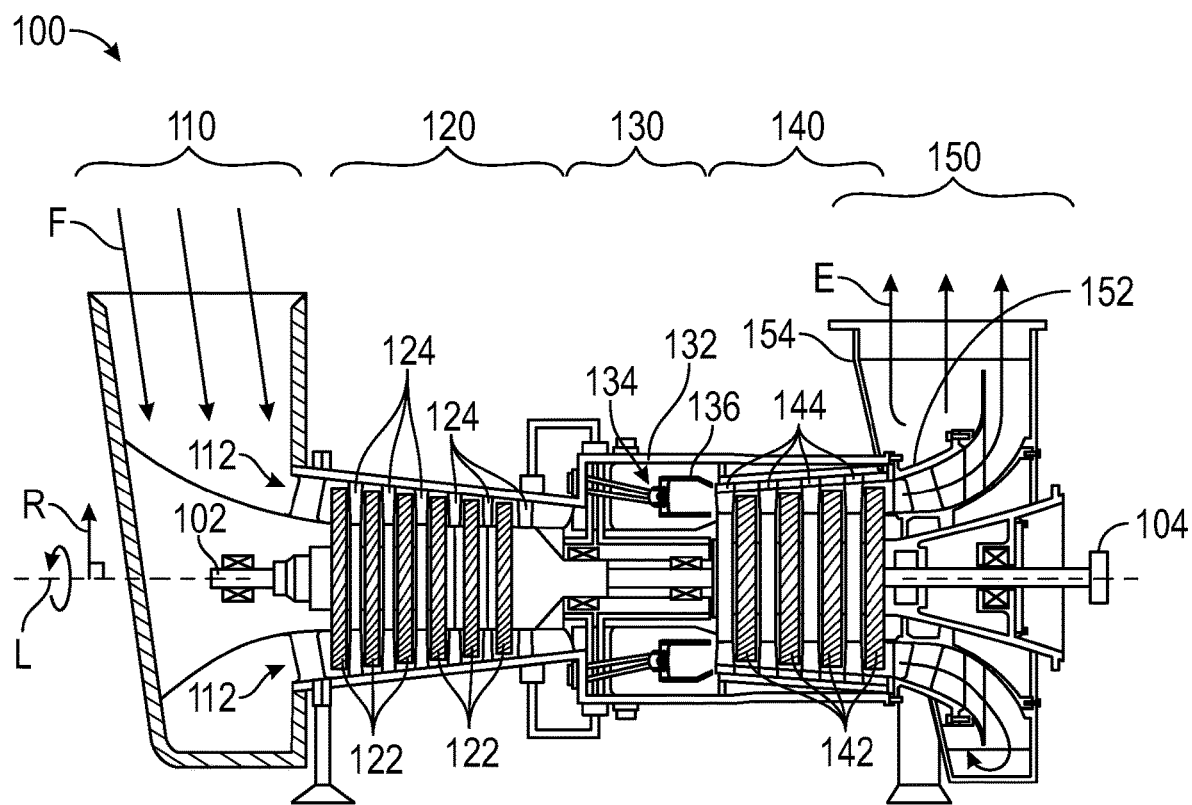
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

References herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). In addition, the terms "respective" and "respectively" signify an association between members of a group of first components and members of a group of second components. For example, the phrase "each component A connected to a respective component B" would signify A1 connected to B1, A2 connected to B2, . . . and AN connected to BN.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" may refer to any axis or direction that is substantially perpendicular to longitudinal axis L, and the term "axial" may refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
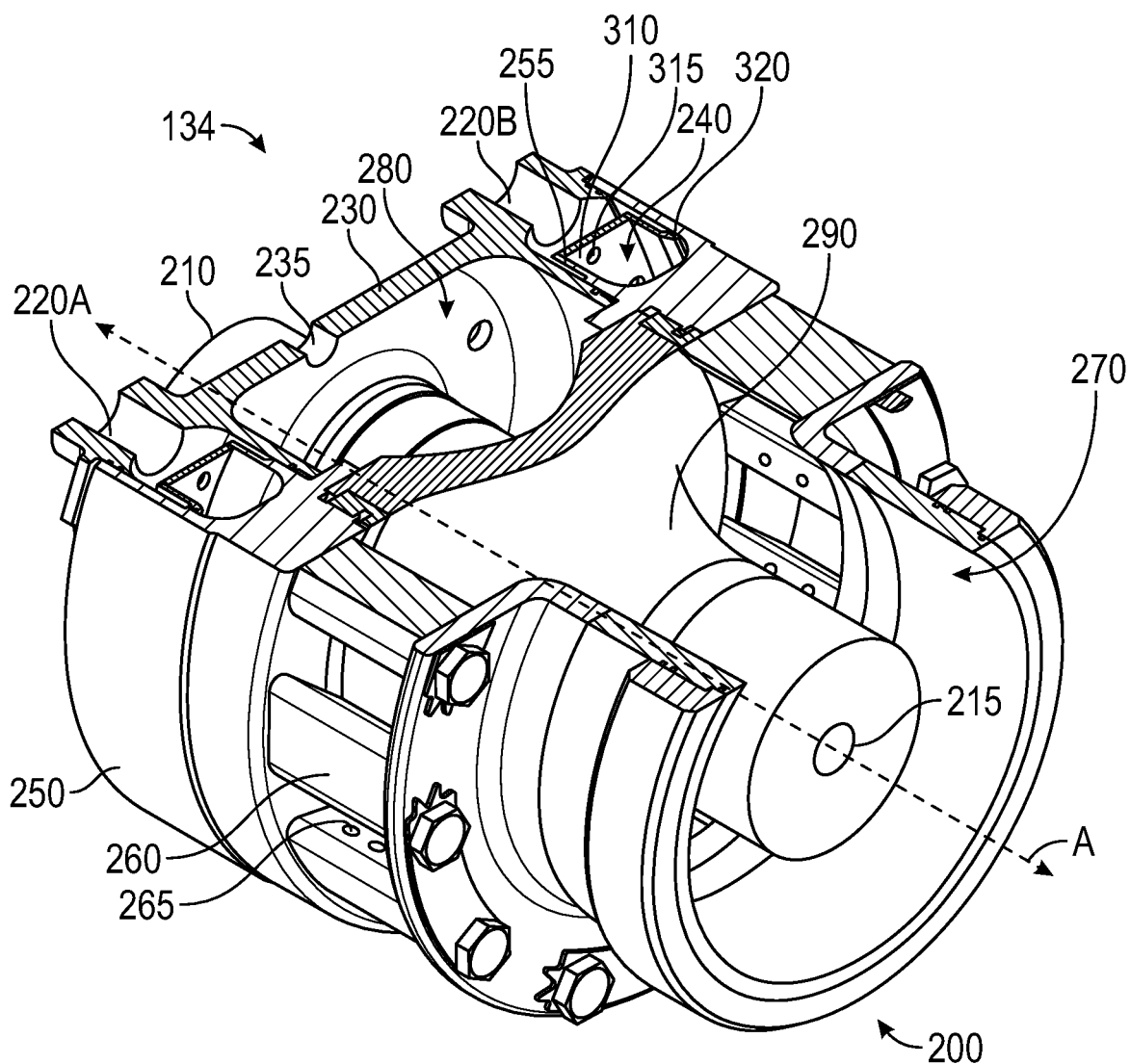
FIG. 2 illustrates a cross-sectional perspective view of an injector head of a fuel injector, according to an embodiment.

FIG. 2 illustrates a cross-sectional perspective view of an injector head 200 of fuel injector 134, according to an embodiment. Injector head 200 has an injector axis A. In the context of injector head 200, a radial axis may refer to any axis or direction that radiates outward from injector axis A at a substantially orthogonal angle to injector axis A, such that the term "radially outward" should be understood to mean farther from or away from injector axis A, and the term "radially inward" should be understood to mean closer or towards injector axis A. In addition, in the context of injector head 200, the term "axial" will refer to any axis or direction that is substantially parallel to injector axis A. It is generally contemplated that injector axis A of injector head 200 is substantially parallel to longitudinal axis L of gas turbine engine 100. However, it should be understood that this is not a requirement.

In an embodiment, one or more pilot fuel channels 210 provide a flow path through injector head 200 to a pilot 215 at the aft end of injector head 200. In the illustrated embodiment, fuel injector 134 consists of only a single pilot channel 210, along injector axis A. However, it should be understood that fuel injector 134 could comprise more than one pilot channel 210. Pilot channel 210 may be in fluid communication with an inlet port (not shown) of fuel injector 134 that may be connected to a supply of pilot fuel. The pilot fuel flows from the inlet port, through pilot channel 210, to pilot 215, which injects the pilot fuel into combustion chamber 136, downstream from injector head 200.

Injector head 200 is supplied with fuel by one or more fuel channels 220. In the illustrated embodiment, fuel injector 134 consists of two fuel channels 220A and 220B. However, it should be understood that fuel injector 134 could consist of any number of fuel channels 220, including one or three or more fuel channels 220. Each fuel channel 220 may be in fluid communication with an inlet port (not shown) of fuel injector 134 that may be connected to a supply of fuel.

Each fuel channel 220 provides a flow path for the fuel through a base plate 230 on a forward end of injector head 200 into an annular fuel gallery 240, defined between base plate 230 and a manifold 250. Fuel gallery 240 is in fluid communication with a plurality of fuel vanes 260. Each fuel vane 260 comprises one or a plurality of outlets 265 that inject fuel into a chamber 270. Thus, the fuel flows from the inlet port, through fuel channel(s) 220, into fuel gallery 240, through fuel vanes 260, out of outlets 265, and into chamber 270.

In addition, working fluid F may flow radially into chamber 270 through the spaces between fuel vanes 260. Fuel vanes 260 swirl working fluid F. Outlets 265 in fuel vanes 260 inject fuel into the swirling working fluid F, which is then redirected axially out of chamber 270 by a conical body 290.

Base plate 230 may be perforated, so as to comprise a plurality of apertures 235 extending from the forward side of base plate 230 to the aft side of base plate 230. Each aperture 235 allows working fluid F to flow from an exterior of injector head 200 into an annular air gallery 280, defined by base plate 230, manifold 250, and conical body 290. Working fluid F in air gallery 280 may flow out through pilot 215.

A distributor plate 310 is disposed radially within fuel gallery 240 to divide fuel gallery 240 into a forward side and an aft side. Distributor plate 310 is an annular disk around injector axis A and comprising an open center to accommodate the various components of injector head 200 that distributor plate 310 encircles. In addition, distributor plate 310 is perforated, so as to comprise a plurality of apertures 315 extending from the forward side of distributor plate 310 to the aft side of distributor plate 310. This enables fuel to flow through distributor plate 310 from the forward side to the aft side of fuel gallery 240.

Distributor plate 310 is held in place on a radially inner edge by an inner arm 255 of manifold 250, and on a radially outer edge by an outer arm 320. Both inner arm 255 and outer arm 320 are annular around injector axis A and concentric with distributor plate 310. The edges of distributor plate 310 may be bonded to inner arm 255 and outer arm 320 in any suitable manner, including brazing, welding, soldering, and/or the like.

In the illustrated embodiment, fuel gallery 240 encircles air gallery 280 and is concentric with air gallery 280 around injector axis A. In addition, both fuel gallery 240 and air gallery 280 encircle and are concentric with pilot channel 210, which extends along injector axis A to pilot 215 in the center of injector head 200. However, it should be understood that this is simply one example. In general, the disclosed distributor plate 310 may be used to divide any annular gallery, and the benefits of distributor plate 310 may be achieved in any gallery in which a temperature differential occurs between distributor plate 310 and the components to which distributor plate 310 is bonded.

Figure 3:
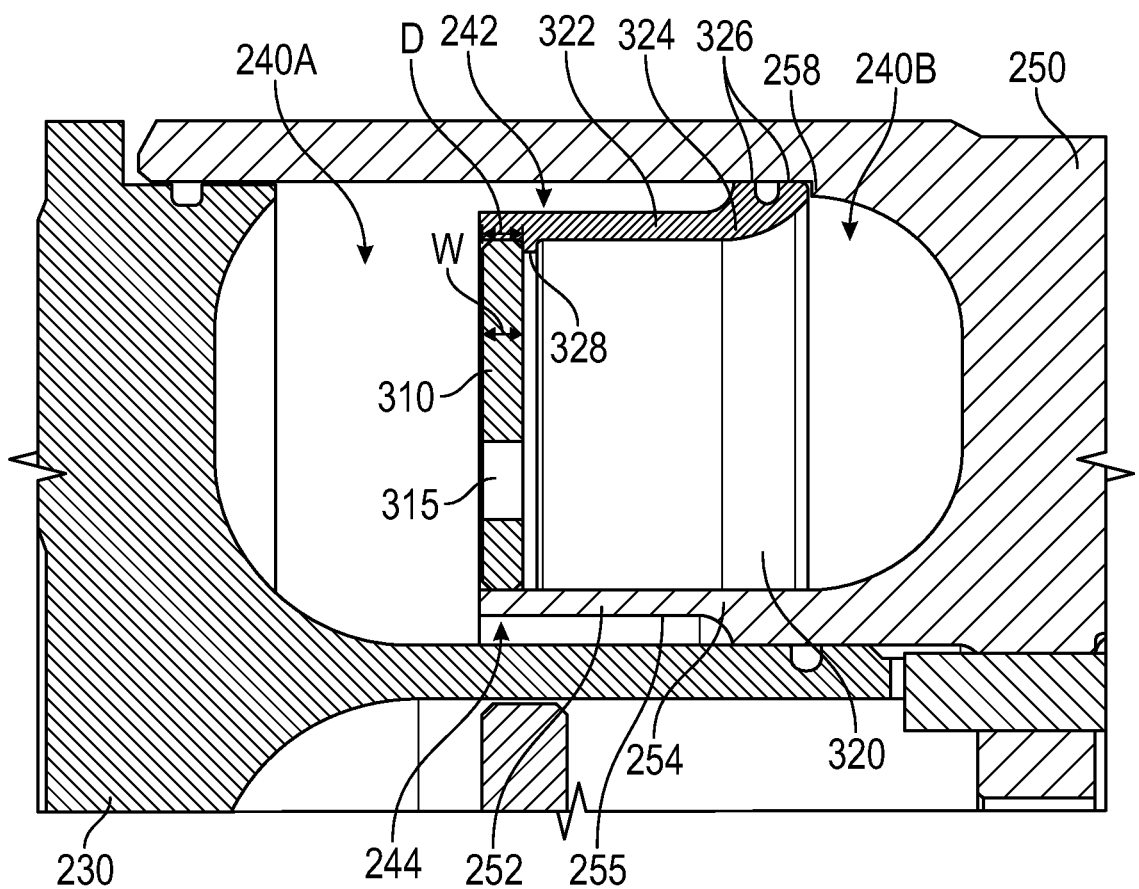
FIG. 3 illustrates a cross-sectional side view of a portion of an injector head of a fuel injector, according to an embodiment.

FIG. 3 illustrates a cross-sectional side view of a portion of injector head 200 of fuel injector 134, according to an embodiment. Distributor plate 310 extends radially across a portion of fuel gallery 240 to divide fuel gallery 240 into a forward region 240A and an aft region 240B. It should be understood that fuel channel(s) 220 supply fuel to forward region 240A of fuel gallery 240, and fuel vanes 260 are in fluid communication with aft region 240B of fuel gallery 240, such that fuel flowing from the fuel supply to outlets 265 of fuel vanes 260 must pass through distributor plate 310.

Outer arm 320 comprises an axial portion 322 that extends parallel or substantially parallel to injector axis A. An outer diameter of axial portion 322 is less than an outer diameter of fuel gallery 240, such that a space 242 exists between axial portion 322 and a radially outer surface of fuel gallery 240. Notably, the radially outer surface of fuel gallery 240 represents the radially inward facing surface of the outer wall of manifold 250.

At an aft end, outer arm 320 transitions into a curved portion 324 that curves radially outward, relative to axial portion 322, such that one or more landings 326 contact the radially inward facing surface of the outer wall of manifold 250. Landing(s) 326 of outer arm 320 may be bonded to the outer wall of manifold 250 in any suitable manner, including brazing, welding, soldering, and/or the like. Axial portion 322 and curved portion 324 of outer arm 320, along with the radially outer surface of fuel gallery 240, define space 242. The bonding of curved portion 324 to the radially outer surface of fuel gallery 240 seals the downstream end of space 242, such that fuel cannot flow to aft region 240B of fuel gallery 240 via space 242.

The outer wall of manifold 250 may comprise a lip 258 that extends radially inward. When assembled, the forward side of lip 258 abuts the outer trailing edge of outer arm 320, to thereby prevent axial translation of outer arm 320, relative to manifold 250.

Inner arm 255 comprises an axial portion 252 that extends parallel or substantially parallel to injector axis A. An inner diameter of axial portion 252 is greater than an inner diameter of fuel gallery 240, such that a space 244 exists between axial portion 252 and a radially inner surface of fuel gallery 240. In the illustrated embodiment, the radially inner surface of fuel gallery 240 represents a radially outward facing surface of an axial arm of base plate 230.

At an aft end, inner arm 255 transitions into a curved portion 254 that curves radially inward, relative to axial portion 252. Axial portion 252 and curved portion 254 of inner arm 255, along with the radially inner surface of fuel gallery 240, define space 244. The integration of curved portion 254 with manifold 250 seals the downstream end of space 244, such that fuel cannot flow to aft region 240B of fuel gallery 240 via space 244.

In the illustrated embodiment, manifold 250 comprises inner arm 255. Inner arm 255 may be an integrated extension of manifold 250. However, in an alternative embodiment, inner arm 255 could be a separate component, similar to outer arm 320, that is bonded to manifold 250 or another component of injector head 200 to seal space 244. As yet another alternative embodiment, outer arm 320 could be an integrated extension of manifold 250, and inner arm 255 could be a separate component or an integrated extension of manifold 250. Axial portion 322 of outer arm 320 and axial portion 252 of inner arm 255 may have the same axial length (e.g., parallel to injector axis A) or different axial lengths.

Distributor plate 310 extends radially between a forward edge of axial portion 322 of outer arm 320 and a forward edge of axial portion 252 of inner arm 255. In other words, the outer diameter of distributor plate 310 matches the inner diameter of axial portion 322 of outer arm 320, and the inner diameter of distributor plate 310 matches the outer diameter of axial portion 252 of inner arm 255. The radially outer edge of distributor plate 310, representing the outer circumference of distributor plate 310, may be bonded to axial portion 322 of outer arm 320. Similarly, the radially inner edge of distributor plate 210, representing the inner circumference of distributor plate 310, may be bonded to axial portion 252 of inner arm 255. In both cases, the bonding may be performed in any suitable manner, including brazing, welding, soldering, and/or the like. In a preferred embodiment, the bonding is performed by brazing, which includes soldering (e.g., using a copper and zinc alloy) at high temperature.

In an embodiment, axial portion 322 of outer arm 320 may comprise a lip 328 that extends radially inward. When assembled, the forward side of lip 328 abuts the aft side of distributor plate 310, to thereby prevent axial translation of distributor plate 310, relative to outer arm 320. The axial distance D between the forward side of lip 328 and the forward end of outer arm 320 may be equal or substantially equal to the axial width W of distributor plate 310. In this case, the forward side of distributor plate 310 may be substantially flush with the forward end of outer arm 320. In an alternative embodiment, the axial distance D of the forward side of lip 328 from the forward end of outer arm 320 may be greater than or less than the axial width W of distributor plate 310.

Distributor plate 310 seals the space between outer arm 320 and inner arm 255, to thereby divide fuel gallery 240 into a forward region 240A and an aft region 240B. The only way for fuel in forward region 240A to flow into aft region 240B is through apertures 315 within distributor plate 310. In particular, the plurality of apertures 315 are configured to allow fuel to flow from forward region 240A to aft region 240B of fuel gallery 240. Furthermore, the only way for fuel to enter fuel vanes 260 is from aft region 240B. In this manner, distributor plate 310 provides flow metering and fuel distribution to fuel vanes 260.

Apertures 315 may be arranged in any suitable pattern to achieve the desired characteristics of flow metering and fuel distribution. Apertures 315 may be arranged in one or a plurality of sets. For example, one set of apertures 315 may be arranged around the circumference of distributor plate 310 at a first radius, and a second set of apertures 315 may be arranged around the circumference of distributor plate 310 at a second radius that is greater than the first radius. The apertures 315 in each set of apertures 315 may be arranged at equidistant intervals, such that each aperture 315 in the set is equidistantly spaced from two adjacent apertures 315 in the set. In addition, each set of apertures 315 may be offset from any adjacent set of apertures 315, such that no pair of apertures 315 within adjacent sets are aligned along a radial axis that is perpendicular to injector axis A. In other words, none of the apertures 315 in one set are radially aligned with any of the apertures 315 in an adjacent set.

Figure 4:
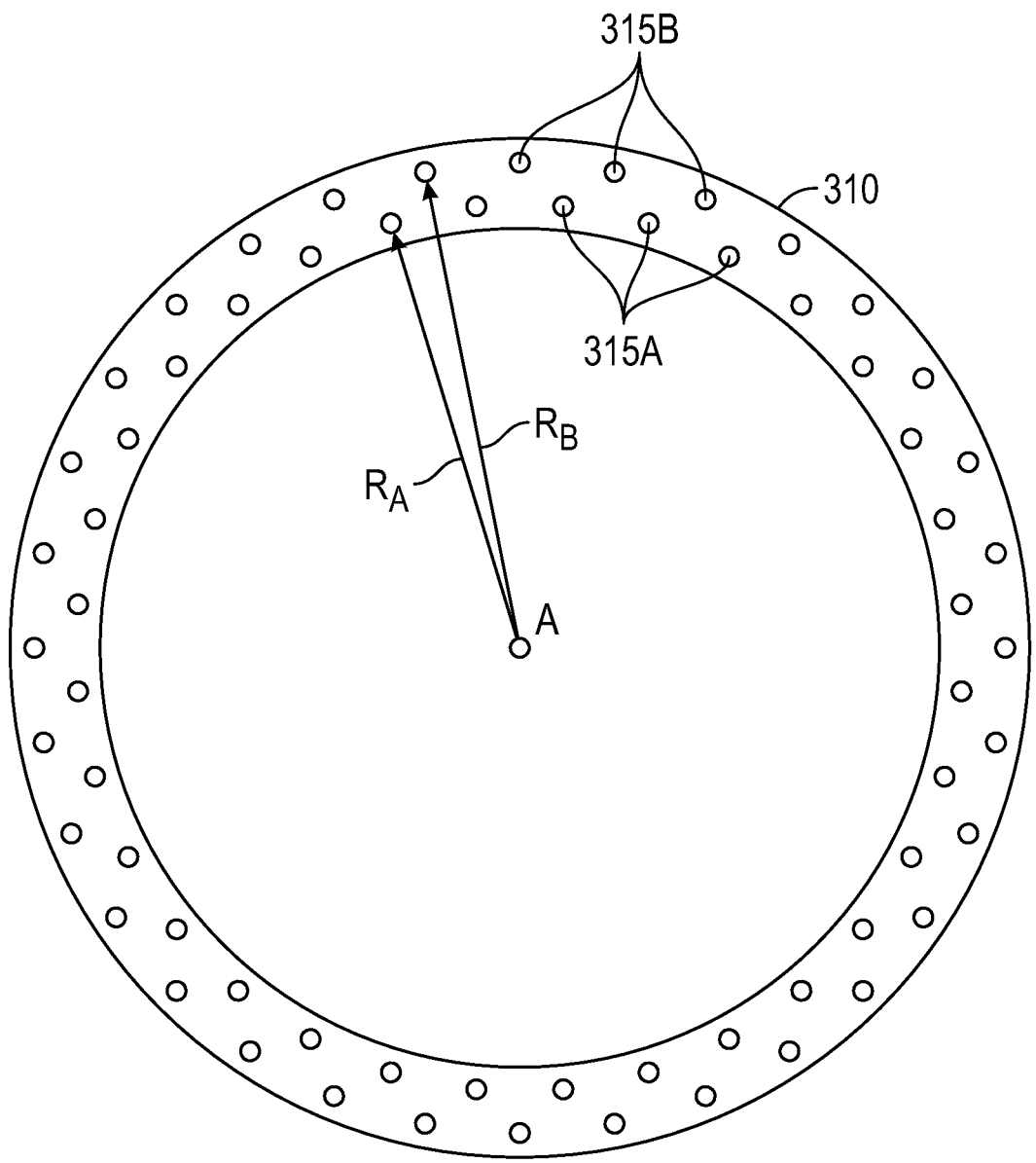
FIG. 4 illustrates a distributor plate, viewed down an injector axis, according to an embodiment.

FIG. 4 illustrates distributor plate 310, viewed down injector axis A, according to an embodiment. In the illustrated embodiment, distributor plate 310 has a first set of apertures 315A that are all at a first radius RA from injector axis A, and a second set of apertures 315B that are all at a second radius RB from injector axis A. Radius RB is greater than radius RA. The second set of apertures 315B is offset from the first set of apertures 315A, such that no aperture 315A is aligned with any aperture 315B along a radial axis perpendicular to injector axis A. In an alternative embodiment, distributor plate 310 may consist of only a single set of apertures 315 or three or more sets of apertures 315 that are all at different radii and/or offset in this manner. While a certain number of apertures 315 is illustrated, it should be understood that distributor plate 310 may consist of any number of apertures 315 that is suitable for the desired characteristics of flow metering and fuel distribution.

INDUSTRIAL APPLICABILITY

A fuel gallery 240 of a fuel injector 134 comprises a distributor plate 310 for flow metering and fuel distribution. In particular, distributor plate 310 creates a pressure drop from forward region 240A to aft region 240B, which evens out the flow of fuel prior to entering fuel vanes 260.

The fuel flowing through distributor plate 310 is significantly cooler (e.g., 100 degrees Fahrenheit) than the high-temperature environment (e.g., 900 degrees Fahrenheit) around injector head 200. As a result, manifold 250, which is subject to the high-temperature environment, has a significantly higher temperature than distributor plate 310, which is in the flow path of the cooler fuel. The relative thermally-induced change in size of distributor plate 310 is less than the thermally-induced change in size of the geometry around distributor plate 310. In a traditional implementation, in which a distributor plate is secured directly to the inner and outer walls of the gallery, the temperature differential between the distributor plate and the manifold results in stresses and strains near the bonding between the distributor plate and the manifold, which impacts the durability and longevity of fuel injector 134.

In disclosed embodiments, distributor plate 310 is bonded to an outer arm 320 and an inner arm 255. Each of outer arm 230 and inner arm 255 acts as a lever, to isolate the thermal expansion of distributor plate 310 from the thermal expansion of manifold 250. In particular, the motion and expansion of distributor plate 310, within fuel gallery 240, causes outer arm 230 and inner arm 255 to bend into and/or out of spaces 242 and 244. For example, as the temperature rises during operation, distributor plate 310 tends to move radially inward. In this case, inner arm 255 will bend radially inward, into space 244. Outer arm 320 will also bend radially inward to expand space 242. It should be understood that the reverse may happen as the temperature decreases. As a consequence of the levering of outer arm 230 and inner arm 255, in this manner, thermal stresses and strains are concentrated in outer arm 230 and inner arm 255, thereby reducing the stresses and strains on the surrounding geometry.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a gas turbine engine, it will be appreciated that it can be implemented in various other types of engines and machines with fuel injectors, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A fuel injector assembly comprising:
   a fuel gallery that is annular around an injector axis and includes an inner diameter and an outer diameter;
   an inner arm that is annular around the injector axis and positioned within the fuel gallery, wherein the inner arm includes a first axial portion, and wherein an inner diameter of the first axial portion is greater than the inner diameter of the fuel gallery, such that a first space exists between the first axial portion and a radially inner surface of the fuel gallery;
   an outer arm that is annular around the injector axis and positioned within the fuel gallery, wherein the outer arm includes a second axial portion, wherein an outer diameter of the second axial portion is less than the outer diameter of the fuel gallery, such that a second space exists between the second axial portion and a radially outer surface of the fuel gallery; and
   a distributor plate that is annular around the injector axis and positioned between the first axial portion and the second axial portion to divide the fuel gallery into a forward region and an aft region, wherein a radially inner edge of the distributor plate is bonded to the first axial portion, and wherein a radially outer edge of the distributor plate is bonded to the second axial portion.

2. The fuel injector assembly of claim 1, wherein the inner arm further includes a curved portion that curves radially inward, relative to the first axial portion, to define the first space, such that an aft end of the first space is sealed.

3. The fuel injector assembly of claim 1, wherein the outer arm further includes a curved portion that curves radially outward, relative to the second axial portion, to define the second space, such that an aft end of the second space is sealed.

4. The fuel injector assembly of claim 1, further comprising a manifold that defines at least a portion of the fuel gallery, wherein the manifold includes the inner arm.

5. The fuel injector assembly of claim 4, wherein the outer arm is a separate component from the manifold.

6. The fuel injector assembly of claim 5, wherein the outer arm further includes a curved portion that curves radially outward, relative to the second axial portion, to define the second space, wherein the curved portion comprises one or more landings that contact an outer wall of the manifold, and wherein the one or more landings are bonded to the outer wall of the manifold.

7. The fuel injector assembly of claim 1, wherein both the first axial portion of the inner arm and the second axial portion of the outer arm are parallel to the injector axis.

8. The fuel injector assembly of claim 1, wherein an axial length of the first axial portion of the inner arm is equal to an axial length of the second axial portion of the outer arm.

9. The fuel injector assembly of claim 1, wherein the second axial portion of the outer arm comprises a lip that extends radially inward, and wherein a forward side of the lip abuts an aft side of the distributor plate.

10. The fuel injector assembly of claim 9, wherein a distance between the forward side of the lip and a forward end of the outer arm is equal to an axial width of the distributor plate.

11. The fuel injector assembly of claim 1, wherein the distributor plate comprises a plurality of apertures extending from a forward side of the distributor plate to an aft side of the distributor plate, wherein each of the plurality of apertures is configured to allow fuel to flow from the forward region to the aft region of the fuel gallery.

12. The fuel injector assembly of claim 11, wherein the plurality of apertures comprises a first set of apertures and a second set of apertures, wherein each of the first set of apertures and the second set of apertures is arranged around a circumference of the distributor plate at equidistant intervals, and wherein the first set of apertures is positioned at a different radius from the injector axis than the second set of apertures.

13. The fuel injector assembly of claim 12, wherein the first set of apertures is offset from the second set of apertures, such that none of the apertures in the first set are radially aligned with any of the apertures in the second set.

14. A fuel injector comprising:
   a manifold that includes the fuel injector assembly of claim 1;
   one or more fuel channels that supply fuel to the forward region of the fuel gallery; and
   one or more fuel vanes in fluid communication with the aft region of the fuel gallery, wherein each of the one or more fuel vanes includes one or more outlets.

15. A gas turbine engine comprising:
   a compressor;
   a combustor downstream from the compressor, wherein the combustor includes a plurality of the fuel injector of claim 14; and
   a turbine downstream from the combustor.

16. A fuel injector comprising:
a manifold that defines a fuel gallery that is annular around an injector axis, wherein the manifold comprises an outer wall, and an inner arm that is annular around the injector axis and positioned within the fuel gallery, wherein the inner arm includes a first axial portion, and a first curved portion that curves radially inward, relative to the first axial portion, to define a first space, between the first axial portion and a radially inner surface of the fuel gallery, with a sealed aft end;
an outer arm that is annular around the injector axis and positioned within the fuel gallery, wherein the outer arm includes a second axial portion, and a second curved portion that curves radially outward, relative to the second axial portion, to define a second space, between the second axial portion and a radially outer surface of the fuel gallery, with a sealed aft end; and
a distributor plate that is annular around the injector axis and positioned between the first axial portion and the second axial portion to divide the fuel gallery into a forward region and an aft region, wherein a radially inner edge of the distributor plate is bonded to the first axial portion, wherein a radially outer edge of the distributor plate is bonded to the second axial portion, wherein the distributor plate comprises a plurality of apertures extending from a forward side of the distributor plate to an aft side of the distributor plate, and wherein each of the plurality of apertures is configured to allow fuel to flow from the forward region to the aft region of the fuel gallery.

17. The fuel injector of claim 16, wherein the outer arm is a separate component from the manifold.

18. The fuel injector of claim 17, wherein the curved portion comprises one or more landings that contact the outer wall of the manifold, and wherein the one or more landings are bonded to the outer wall of the manifold.

19. The fuel injector of claim 16, wherein the second axial portion of the outer arm comprises a lip that extends radially inward, and wherein a forward side of the lip abuts an aft side of the distributor plate.

20. A gas turbine engine comprising:
a compressor;
a combustor downstream from the compressor, wherein the combustor includes a plurality of fuel injectors, and wherein each of the plurality of fuel injectors comprises
a manifold that defines a fuel gallery that is annular around an injector axis, wherein the manifold comprises an inner arm that is annular around the injector axis and positioned within the fuel gallery, wherein the inner arm includes a first axial portion, and a first curved portion that curves radially inward, relative to the first axial portion, to define a first space, between the first axial portion and a radially inner surface of the fuel gallery, with a sealed aft end,
an outer arm that is annular around the injector axis and positioned within the fuel gallery, wherein the outer arm includes a second axial portion, and a second curved portion that curves radially outward, relative to the second axial portion, to define a second space, between the second axial portion and a radially outer surface of the fuel gallery, with a sealed aft end, and
a distributor plate that is annular around the injector axis and positioned between the first axial portion and the second axial portion to divide the fuel gallery into a forward region and an aft region, wherein a radially inner edge of the distributor plate is bonded to the first axial portion, wherein a radially outer edge of the distributor plate is bonded to the second axial portion, wherein the distributor plate comprises a plurality of apertures extending from a forward side of the distributor plate to an aft side of the distributor plate, and wherein each of the plurality of apertures is configured to allow fuel to flow from the forward region to the aft region of the fuel gallery; and
a turbine downstream from the combustor.

* * * * *